(12) United States Patent
Wuidart

(10) Patent No.: US 6,219,263 B1
(45) Date of Patent: Apr. 17, 2001

(54) ELECTRONIC POWER SUPPLY DEVICE

(75) Inventor: Luc Wuidart, Pourrières (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/945,921

(22) PCT Filed: May 15, 1996

(86) PCT No.: PCT/FR96/00740

§ 371 Date: Nov. 18, 1997

§ 102(e) Date: Nov. 18, 1997

(87) PCT Pub. No.: WO96/37038

PCT Pub. Date: Nov. 21, 1996

(30) Foreign Application Priority Data

May 19, 1995 (FR) .................................................. 95 06007

(51) Int. Cl.⁷ ...................................................... H02M 1/00

(52) U.S. Cl. ............................................................. 363/125

(58) Field of Search ..................................... 363/125, 126, 363/127, 128, 81, 84

(56) References Cited

U.S. PATENT DOCUMENTS

| 4,186,418 | * | 1/1980 | Seiler | 361/91 |
| 5,345,164 | | 9/1994 | Lesea | 323/208 |

FOREIGN PATENT DOCUMENTS

| 0 600 340 | 6/1994 | (EP) | H05B/41/29 |
| 0 602 908 | 6/1994 | (EP) | H05B/41/29 |
| WO 91/02400 | 2/1991 | (WO) | H02M/1/12 |
| WO 92/22953 | 12/1992 | (WO) | H02M/1/12 |

* cited by examiner

*Primary Examiner*—Adolf Deneke Berhane
(74) *Attorney, Agent, or Firm*—Wolf, Greenfield & Sacks, P.C.; James H. Morris; Theodore E. Galanthay

(57) ABSTRACT

A power factor correction circuit using a first rectifier diode to control the series charging of two capacitors and two rectifier diodes to control the parallel discharging of the two capacitors. The power factor correction circuit further includes a resistor that is series-connected with the first diode to improve the power factor and to reduce the current drawn when the voltage is turned on. The rectifier diodes are advantageously voltage limiting diodes to protect the down-line circuitry against overvoltages. In one improvement, a current-controlled electronic switch is used for protection against overvoltages that are just above the peak value of the line voltage.

9 Claims, 3 Drawing Sheets

ELECTRONIC POWER SUPPLY DEVICE

BACKGROUND OF THE INVENTION

1. Field of the Invention

The invention relates to an electronic supply device. More particularly, it relates to a device with a power factor correction circuit.

2. Description of the Prior Art

There is a known circuit for the correction of power factor without line inductance. The circuit is connected to the output of a bridge rectifier and uses rectifier diodes for the series charging and parallel discharging of two filtering capacitors. An electrical diagram of such a circuit is shown in FIG. 1. A bridge rectifier 1 receives a periodically varying voltage $V_{AC}$ at a pair of input terminals. A power factor correction circuit 3 is connected between the rectifier 1 and a load 2 at a pair of output terminals of the rectifier. This circuit 3 uses two filtering capacitors, C1 and C2, having the same capacitance.

A first rectifier diode D1 is connected directly between the two capacitors C1 and C2. The assembly is connected between two output terminals of the bridge rectifier.

A second rectifier diode D2 is reverse-connected in parallel with the combination of the first capacitor C1 in series with the first diode D1.

A third rectifier diode D3 is reverse-connected in parallel with the combination of the second capacitor in series with the first diode D1.

The working of such a circuit shall now be explained with reference to the curves shown in FIG. 2.

In a steady operating state, at a start of a half-wave of the line voltage $V_{in}$, the diode D1 is off. The diodes D2 and D3 are on. This corresponds to the end of the period of the discharging of the capacitors C1 and C2. When the line voltage $V_{in}$ exceeds the charging voltage of the capacitors, the diodes D2 and D3 go to the off state. Then, when the line voltage $V_{in}$ exceeds the sum of the charging voltages of the two capacitors (Vc1+Vc2), the diode D1 becomes conductive (T1) and the two capacitors are charged in series until the line voltage reaches its peak value Vc (T2). The diode D1 then goes back to the off state. The two capacitors are each charged at Vc/2 (being identical capacitors).

The line voltage, which then decreases, becomes lower than this charging voltage Vc/2: the diodes D2 and D3 therefore come on, while D1 remains off (T3). The capacitors are again parallel-connected. The capacitor C1 supplies the load through the diode D3 and the capacitor C2 supplies the load through the diode D2. This process stops as soon as the line voltage $V_{in}$ again starts increasing (at the next half-wave) and becomes greater than the voltage of each capacitor: the diodes D2 and D3 go back to the off state, the diode D1 remains off. The system is then at T0, and the cycle then repeats. The current waveform $I_{in}$ shown in FIG. 2 is obtained.

Between T0 and T1, it is the mains supply system ($V_{AC}$) that directly supplies the load (with D1, D2 and D3 off). The shape of the current waveform for a value of power $P_{out}$ consumed in the load 2 is given by the relationship:

$$I_{in(t)} = P_{out}/V_{in(t)}$$

For Pout constant, between T0 and T1, $V_{in}$ increases and $I_{in}$ decreases.

Between T1 and T2, the capacitors are charged. On top of the current consumed in the load 2 (shown in dashes), there is superimposed the charging current for the capacitors.

Between T2 and T3, the charging of the capacitors, each at half of the peak voltage Vc, is over. The current $I_{in}$ is only the current consumed in the load 2 and the waveform of the current is given by the relationship:

$$I_{in(t)} = P_{out}/V_{in(t)}.$$

The line voltage decreases and $I_{in}$ decreases (with $P_{out}$ constant).

Finally, between T3 and T0, it is the capacitors C1 and C2 that supply the load 2. The current $I_{in}$ drawn from the rectifier is zero.

The circuit 3 therefore makes it possible to increase the angle of flow of the bridge rectifier. The waveform of the current $I_{in}$ is spread over the voltage half-wave with three phases of conduction: [T0–T1], [T1–T2] and [T2–T3]. In this way, the power factor of the device (namely the ratio of the actual power to the apparent total power) is improved since the line is forced to consume current during the most significant part of the voltage wave, namely when the instantaneous value of the line voltage exceeds half of the peak value Vc.

However, for the charging of the capacitors, there is a drawing of charging current which gives rise to a steep leading edge of the line current. There is therefore a current peak. This corresponds to non-negligible low frequency harmonic contents that limit the value of the power factor (with a supply of power at harmonic frequencies different from the line frequency).

SUMMARY OF THE INVENTION

An object of the invention is to improve the aforementioned power factor correction circuit.

An object of the invention is to reduce the low frequency harmonic contents of the waveform of the current drawn from the rectifier.

As characterized, the invention relates to an electronic supply device for a load comprising a bridge rectifier receiving a periodic voltage at a pair of input terminals and a power factor correction circuit connected to a pair of output terminals of the rectifier. The power correction circuit includes two capacitors, a rectifier diode to charge them in series and two rectifier diodes to discharge them in parallel. According to the invention, the correction circuit further includes a resistor that is series-connected to the first rectifier diode to limit the current drawn in the capacitors and reduce the low frequency harmonic contents of the current conducted by the rectifier.

The addition of a resistor in series with the diode that enables the control of the charging of the capacitors in series makes it possible to attenuate the charging current. This results in a more rounded-out waveform of the line current: the low frequency harmonic contents of such a waveform are highly attenuated. The power factor of this device is thus appreciably improved.

Furthermore, when the voltage is turned on, the capacitors are charged immediately. However, the resistor, in addition to attenuating low frequency harmonic contents, will limit the drawn current which, if excessively high, damages the diodes and the capacitors.

In one improvement of the invention, a particular three-diode structure of the power factor correction circuit according to the invention is used to protect the circuitry downline with respect to the rectifier against overvoltages on the mains supply system.

According to the invention, zener diodes are used as rectifier diodes. In the event of overvoltage in the mains supply system, the three zener diodes are series-connected. The circuitry is therefore protected against overvoltages greater than three zener voltages. Each capacitor is protected against overvoltages greater than two zener voltages.

One variant uses a current-controlled power switch parallel-connected with the resistor and the diode which controls the series charging of the capacitors. A zener diode is used for each of the two diodes that controls the discharging of the capacitors. In this way, it is possible to protect the circuitry against overvoltages greater than two zener voltages and the capacitors against overvoltages greater than one zener voltage.

BRIEF DESCRIPTION OF THE DRAWINGS

Other features and advantages of the invention are described in detail in the following description made with reference to the appended drawings, in which.

MORE DETAILED DESCRIPTION

Figure 1:
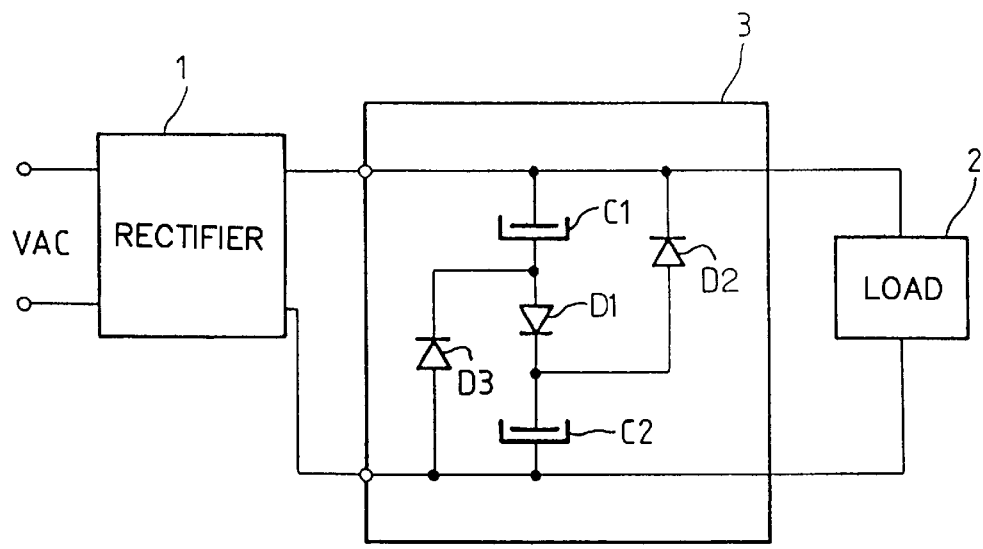
FIG. 1 is an electrical drawing of a power factor correction circuit already described.
Figure 3:
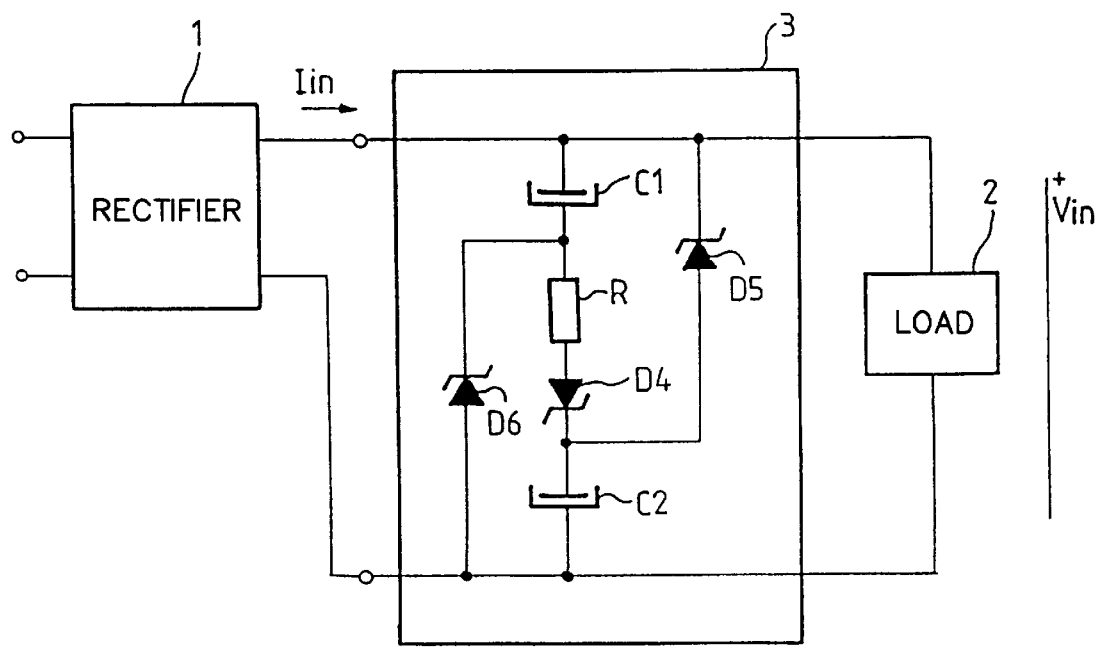
FIG. 3 shows a diagram of a power factor correction circuit according to the invention.

FIG. 3 shows a diagram of a power factor correction circuit 3 according to the invention, connected to a pair of output terminals of a bridge rectifier supplied by a mains voltage $V_{AC}$.

The rectifier 1 and the power factor correction circuit 3 supply a load 2.

The circuit 3 has two filtering capacitors C1 and C2 series-connected with the output terminals of the rectifier 1. A resistor R and a first directly mounted diode D4 are series-connected between the two capacitors C1, C2.

A second diode D5 is reverse-connected and parallel-connected with the series-connected assembly formed by the first capacitor C1, the resistor R and the first diode D4.

A third diode D6 is reverse-connected and parallel-connected to the series-connected assembly of the second capacitor C2, the resistor R and the first diode D4.

Figure 2:
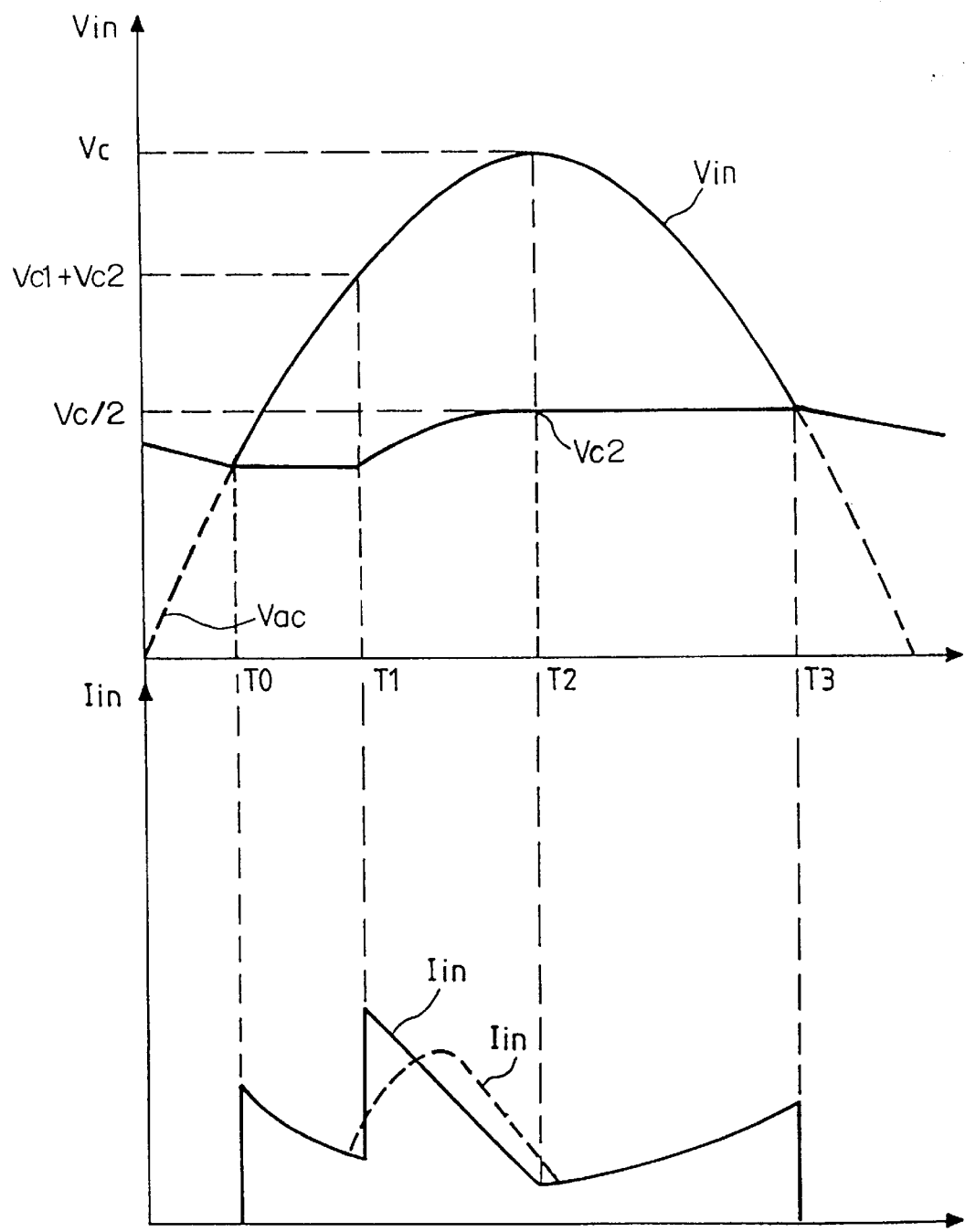
FIG. 2 shows corresponding waveforms of current and line voltage.

The assembly formed by the resistor R and the first diode D4 controls the series charging of the capacitors C1 and C2. The resistor R according to the invention makes it possible to limit the current drawn in the capacitors when the voltage is first turned on. In the worst possible case, when the equipment is turned on at a time corresponding to a half-wave peak, the value of the drawn current will thus be limited to Vc/R, Vc being the peak voltage of the line voltage. The resistor R according to the invention further enables the charging current to be attenuated. This results in a rounding out of the waveform portion of the corresponding line current as shown in dashes in FIG. 2 (interval [T1–T2]).

The trade-off here is that the resistor consumes current. However, it has been determined in practice that for a resistor consuming only 1% of the power available, the power factor of the device is very appreciably improved.

In one example, for 100 watts, with:
$V_{AC}$=230 volts AC,
C1=C2=40 microfarads,
R=20 ohms, $P_{Rmax}$=1 watt,
there is obtained a power factor PF=0.88.

Finally, the unit formed by the device for rectifying and power factor correction may advantageously take the form of an integrated circuit.

In one improvement shown in FIG. 3, zener diodes are used as rectifier diodes D4, D5 and D6.

Indeed, the structure of the power factor correction circuit 3 has three rectifier diodes series-connected with the pair of output terminals of the rectifier. By using three voltage limitation rectifier diodes, it is then possible to shield the downline circuitry (the load 2) against mains overvoltages greater than three times the limitation voltage (three zener voltages). Furthermore, the structure has two rectifier diodes parallel connected with each of the capacitors.

In the same way, by using two voltage limiting rectifier diodes, each capacitor is shielded against overvoltages greater than twice the limiting voltage (namely two zener voltages). This limiting voltage should be chosen as to be greater than half the peak value Vc of the line voltage.

Figure 4:
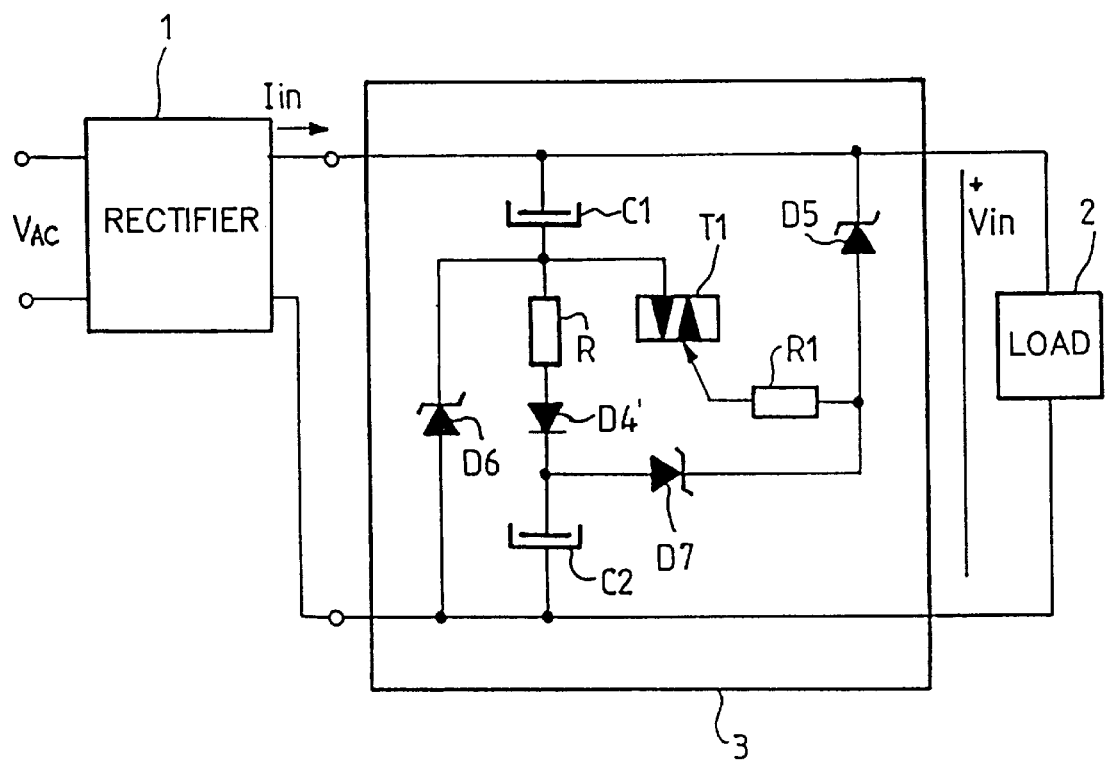
FIG. 4 shows another diagram of a power factor correction circuit according to the invention.

One variant of the power factor correction circuit used for the protection against overvoltages according to the invention is shown in FIG. 4. The diodes D5 and D6 which control the discharging of the capacitors in parallel are voltage limiting rectifier diodes.

However, in parallel with the first rectifier diode D4 that is in series with the resistor R, there is placed an electronic switch T1 current-controlled in reverse by one of the zener diodes, D5 in the example. This electronic switch is, for example, a triac, and a resistor r1 connected to the zener diode D5 gives the negative trigger current needed to activate the triac.

In the event of overvoltage, the assembly D6, T1, D5 allows the passage of the reverse current and enables protection against overvoltages greater than only twice the zener voltage.

As we have seen here above, the diodes D5 and D6 must be such that they remain off when the line voltage reaches the peak value Vc. This leads in practice to taking the following value as a zener voltage:

$$Vz > Vc/2$$

For example, for 220 VAC, the peak voltage Vc of the rectified line voltage $V_{in}$ is equal to 310 volts. If the zener diodes are chosen with a zener voltage of 180 volts, the circuitry is protected for overvoltages of over 360 volts.

This circuit with current-controlled switch requires another zener diode D7 connected between the zener diode D5 and between the series connection of D4' and C2 so that the switch is accurately controlled during the overvoltage. In practice, a 5-volt zener diode is sufficient for this task.

Finally, in the two examples of a power factor correction circuit with protection against the overvoltages, the rectifier device and the correction circuit may be made in one and the same integrated circuit.

What is claimed is:
1. An electronic supply device for a load comprising:
a bridge rectifier having a pair of input terminals that receive a periodic voltage and a pair of output terminals; and
a power factor correction circuit connected to the pair of output terminals of the bridge rectifier, the power factor correction circuit including two capacitors, a first rectifier diode coupled to the two capacitors to charge the two capacitors in series, and second and third rectifier diodes coupled to the two capacitors to discharge the two capacitors in parallel, wherein the power factor correction circuit further includes:
a resistor that is series-connected with the first rectifier diode to limit the current drawn in the two capacitors and to reduce low frequency harmonic contents of a current conducted by the bridge rectifier;

a current-controlled electronic switch that is parallel-connected with the first rectifier diode in series with the resistor; and wherein, to discharge the two capacitors in parallel, the second and third rectifier diodes are zener diodes, to protect the load against overvoltages.

2. The electronic supply device of claim 1, wherein said current-controlled electronic switch is a triac.

3. The electronic supply device of claim 1, wherein a current that controls the current controlled-electronic switch is provided by one of the zener diodes.

4. The electronic supply device of claim 1, wherein the resistor is calibrated to dissipate at most 1% of a nominal power available at the pair of output terminals of the bridge rectifier.

5. The electronic supply device of claim 1, wherein the second and third rectifier diodes are arranged to dissipate overvoltage conditions occurring between the pair of output terminals of the bridge rectifier, and wherein the electronic supply device is integrated within a single integrated circuit.

6. A power factor correction circuit comprising:

a pair of terminals that receive a periodically varying input voltage, the pair of terminals including a first terminal and a second terminal;

a first capacitor and a second capacitor coupled in series between the first terminal and the second terminal, the first capacitor storing a first voltage, and the second capacitor storing a second voltage;

a first voltage controlled switch coupled in series between the first capacitor and the second capacitor that allows charging the first and second capacitors when the input voltage is greater than a sum of the first voltage and the second voltage;

a second voltage controlled switch having a first end that is connected to the first terminal and a second end that is coupled between the first voltage controlled switch and the second capacitor the second voltage controlled switch allowing discharge of the second capacitor when the input voltage is less than the second voltage;

a third voltage controlled switch having a first end that is connected to the second terminal and a second end that is connected between the first voltage controlled switch and the first capacitor, the third voltage controlled switch allowing discharge of the first capacitor when the input voltage is less than the first voltage; and a resistor connected in series between the first capacitor and the first voltage controlled switch that limits a charging current of the first and second capacitors and attenuates low frequency harmonic contents of the charging current when the input voltage is greater than the sum of the first voltage and the second voltage;

wherein the second and third voltage controlled switches have second and third overvoltage limits respectively, and the power factor correction circuit further comprises:

an overvoltage protection assembly having a first end that is connected between the first capacitor and the resistor and having a second end that is connected to the second end of the second voltage controlled switch the overvoltage protection assembly limiting a voltage difference between the first and second terminals to a sum of the overvoltage limits of the second and third voltage controlled switches; and wherein the overvoltage protection assembly includes:

a current controlled electronic switch; and a second resistor, the second resistor being connected in series with the current controlled electronic switch.

7. The power factor correction circuit of claim 6, wherein the power factor collection circuit further comprises:

a fourth voltage controlled switch that couples the second end of the second voltage controlled switch between the first voltage controlled switch and the second capacitor to accurately control the current controlled electronic switch when the periodically varying input voltage exceeds a sum of the second and third overvoltage limits.

8. The power factor correction circuit of claim 7, wherein:

the current controlled electronic switch is a triac;

the second and third voltage controlled switches are zener diodes each having a substantially similar overvoltage limit that is greater than either of the first voltage and the second voltage and lower than the sum of the first voltage and the second voltage; and the fourth voltage controlled switch is a zener diode.

9. The power factor correction circuit of claim 6 or 7, wherein the power factor correction circuit is integrated within a single integrated circuit.

* * * * *